(12) United States Patent
Backes et al.

(10) Patent No.: US 6,767,305 B2
(45) Date of Patent: Jul. 27, 2004

(54) ACTUATING UNIT

(75) Inventors: Wendelin Backes, Wörth (DE); Alexander Zernickel, Herzogenaurach (DE); Juergen Hartmann, Gutenstetten (DE); Ulrich Grau, Emskirchen (DE); Werner Dorsch, Hirschaid (DE); Peter Rieth, Eltville (DE); Johann Jungbecker, Badenheim (DE); Stefan Schmitt, Eltville (DE); Ralf Schwarz, Heidelberg (DE); Oliver Hoffmann, Frankfurt am Main (DE); Joachim Nell, Hanau (DE)

(73) Assignees: Continental Teves AG & Co., oHG, Frankfurt (DE); Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/240,125

(22) PCT Filed: Mar. 26, 2001

(86) PCT No.: PCT/EP01/03420
§ 371 (c)(1),
(2), (4) Date: Sep. 27, 2002

(87) PCT Pub. No.: WO01/73312
PCT Pub. Date: Oct. 4, 2001

(65) Prior Publication Data
US 2003/0050147 A1 Mar. 13, 2003

(51) Int. Cl.⁷ .............................................. F16H 48/06
(52) U.S. Cl. .................... 475/149; 188/72.8; 188/161
(58) Field of Search .......................... 475/149, 5, 346, 475/222; 74/424.82, 424.86, 424.87; 188/72.8, 157, 158, 161

(56) References Cited

U.S. PATENT DOCUMENTS

| | | | | |
|---|---|---|---|---|
| 3,053,105 A | * | 6/1962 | Cole | 74/424.86 |
| 3,924,486 A | * | 12/1975 | Taillardal | 74/424.86 |
| 4,274,297 A | * | 6/1981 | Blurock et al. | 74/424.86 |
| 4,850,457 A | * | 7/1989 | Taig | 188/72.1 |
| 5,154,091 A | * | 10/1992 | Bianco | 74/424.86 |
| 5,555,770 A | * | 9/1996 | Dolata et al. | 74/424.86 |
| 6,139,460 A | * | 10/2000 | Drennen et al. | 188/72.1 |
| 6,213,256 B1 | * | 4/2001 | Schaffer | 188/71.9 |
| 6,230,854 B1 | * | 5/2001 | Schwarz et al. | 1188/156 |
| 6,349,801 B1 | * | 2/2002 | Koth et al. | 188/72.8 |

FOREIGN PATENT DOCUMENTS

| | | |
|---|---|---|
| DE | 2330875 | 1/1975 |
| DE | 19511287 | 1/1996 |
| WO | WO 199827357 | * 6/1998 |
| WO | WO 199942739 | * 8/1999 |
| WO | 9945292 | 9/1999 |
| WO | 9960285 | 11/1999 |
| WO | 0002302 | 1/2000 |
| WO | 0045064 | 8/2000 |

OTHER PUBLICATIONS

Bauer, H.P.: Über das Axialverhalten von Zahnkupplungen. In: Konstruktion 42, 1990, S. 355—S. 360.

* cited by examiner

Primary Examiner—Charles A. Marmor
Assistant Examiner—David D. Le
(74) Attorney, Agent, or Firm—Rader, Fishman & Grauer PLLC

(57) ABSTRACT

An actuating unit for use on an electromechanically actuated disc brake for automotive vehicles including a drive unit or an electric motor, an actuating element for actuating one of two friction linings displaceably arranged in a brake caliper, and a first and a second reducing gear. The first reducing gear is comprised as a ball screw, while a planetary gear is used as the second reducing gear. To increase the efficiency, the present invention discloses a coupling shaft used to transmit forces from the planet cage of the planetary gear to the threaded spindle of the ball screw. The ends of the coupling shaft form universal joints with the planet cage and the threaded spindle.

11 Claims, 2 Drawing Sheets

1

ACTUATING UNIT

TECHNICAL FIELD

The present invention generally relates to actuators and more particularly relates to brake calipers relates to an actuating unit.

BACKGROUND OF THE INVENTION

International patent application WO 99/45292 discloses an electromechanically operating actuating unit of this general type. In the prior-art actuating unit, the force is transmitted from the planet cage to the threaded spindle by means of a positive plug connection that is coupled to the planet cage in a torsion-proof, radially yielding and flexible fashion.

What is disadvantageous in the prior-art actuating unit is that the plug coupling has only one degree of freedom so that all disturbances differing from the degree of freedom of the plug coupling are transmitted. This impairs the efficiency that can be achieved.

BRIEF SUMMARY OF THE INVENTION

In view of the above, an object of the present invention is to disclose an actuating unit of the type initially referred to wherein an increase in efficiency can be achieved.

According to the present invention, this object is achieved in that the force is transmitted from the planet cage to the threaded spindle by means of a coupling shaft, the ends of which form universal joints with the planet cage and the threaded spindle. Preferably, one end of the coupling shaft is accommodated in a hollow spindle member of the threaded spindle.

In another embodiment of the present invention, one end of the coupling shaft is accommodated within the area of the planet cage in an outside ring of a radial bearing that is connected to the planet cage.

In one favorable embodiment used for an electromechanically actuated disc brake for automotive vehicles, the said actuating unit being arranged at a brake caliper in which two friction linings that cooperate with each one lateral surface of a brake disc are arranged so as to be displaceable within limits, wherein one of the friction linings is adapted to be moved into engagement with the brake disc by the actuating unit directly by means of the actuating element and the other friction lining is adapted to be moved into engagement with the brake disc by the effect of a reaction force generated by the brake caliper, wherein the actuating unit comprises an electric motor, the first reducing gear is arranged between the electric motor and the actuating element in terms of effect, and the second reducing gear is arranged between the electric motor and a part of the first reducing gear.

In another embodiment of the subject matter of the present invention, the threaded nut of the ball screw may have a bipartite design, the first part cooperating with the first friction lining, while the conversion of a rotational movement into translation takes place in the second part. It is particularly favorable when the return area for the balls of the ball screw is provided in the second part.

In a design wherein a guide member embracing the threaded nut is provided which is supported on the gearbox case that accommodates the ball screw and on which the threaded spindle is axially supported by means of a radial bead by the intermediary of an axial bearing, it is especially favorable that the rigidity of the radial bead and the area of the guide member opposite the bead are chosen so that the contact surfaces of the axial bearing suffer from an equal deformation during operation. This provision ensures a uniform distribution of the load that acts on the axial bearing, thereby permitting the use of a small bearing that is optimally utilized.

In a favorable aspect of the subject matter of the present invention, wherein the guide member includes force-measuring elements, the said guide member contains an axial groove which accommodates conduits associated with the force-measuring elements. In this arrangement, an electric interface or a plug to which the conduits are connected is preferably arranged in the area of the guide member that faces the friction lining.

In another embodiment of the subject matter of the present invention, the return movement of the balls is through all threads, and the return area for the balls is designed as a rotation prevention mechanism of the threaded nut in the guide member. Expediently, combining two independent functional means in one component optimizes the mounting space.

Besides, it is especially advantageous that the guide member is elastically designed and the threaded nut is arranged in the guide member with a play. It is achieved by this arrangement that the threaded nut is guided only in its rear area by means of the threaded spindle. The disturbances that take effect on the threaded nut are, thus, not supported by way of the sliding friction between the threaded nut and the guide member.

DETAILED DESCRIPTION OF THE PREFERRED EMBODIMENTS

Figure 1:
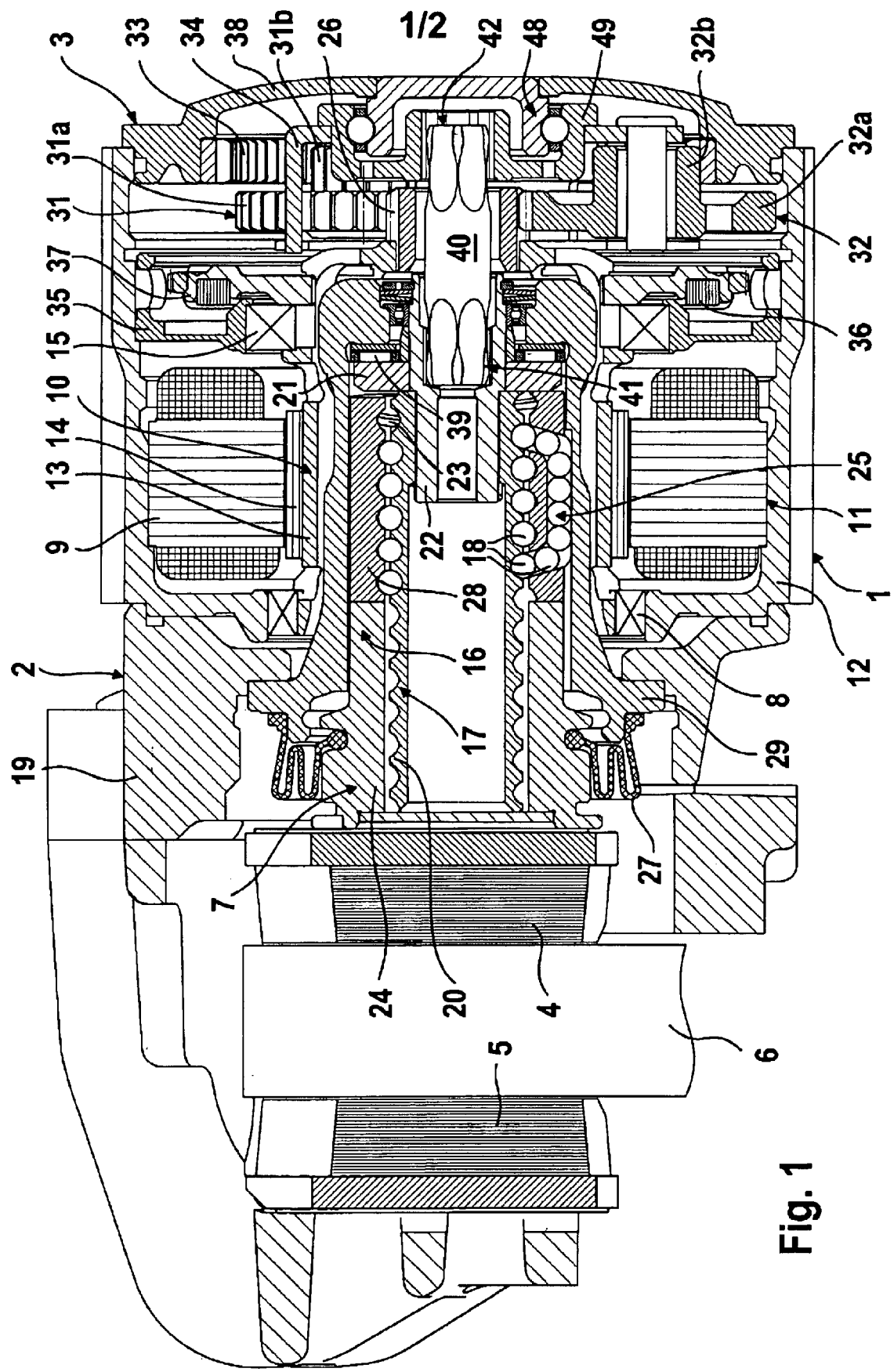
FIG. 1 is an axial cross-sectional view of a design of the electromechanical actuating unit of the present invention.

The electromechanical actuating unit of the present invention, as shown in the drawings, is used to actuate a floating-caliper disc brake whose brake caliper (only represented) is displaceably supported in a stationary holder (not shown). A pair of friction linings 4 and 5 is arranged in the brake caliper so that they face the left-hand and right-hand lateral surfaces of a brake disc 6.

In the following, friction lining 4 that is shown on the right in the drawing is referred to as first friction lining, and the other friction lining designated by reference numeral 5 is referred to as second friction lining. While the first friction lining 4 is movable into engagement with the brake disc 6 by the actuating unit directly by means of an actuating element 7, the second friction lining 5 is urged against the opposite lateral surface of brake disc 6 by the effect of a reaction force generated by the brake caliper when the assembly is actuated.

The actuating unit of the present invention which is fitted to the brake caliper by way of securing means (not shown) has a modular design and is generally comprised of three independent subassemblies or modules, namely a drive unit 1, a first reducing gear 2 that actuates the first friction lining 4, and a second reducing gear 3 that is interconnected between drive unit 1 and the first reducing gear 2 in terms of effect.

The actuating unit 1 mentioned above is comprised of an electric motor 11 which, in the example shown, is a permanent-magnet-energized, electronically commutated motor whose stator 9 is immovably arranged in a motor casing 12 and whose rotor 10 is provided by an annular carrier 13 that carries a plurality of permanent magnet segments 14. The first reducing gear 2 is interposed between the electric motor 10 and the above-mentioned actuating element 7 in terms of effect and, in the example shown, is configured as a ball screw 16 to 18 accommodated in a gearbox case 19, which latter may also be of integral design with the above-mentioned brake caliper. In this arrangement, the ball screw comprises a threaded nut 16 and a threaded spindle 17, with several balls 18 being arranged between the threaded nut 16 and the threaded spindle 17 that circulate upon a rotational movement of the threaded spindle 18 and put the threaded nut 16 into an axial movement or translation. The threaded nut 16 preferably has a bipartite design and is composed of a first part 24 that forms the above-mentioned actuating element 7 and a second part 28 in which a return area or channel 25 for the balls 18 is designed. In the return channel, the balls 18 may run back to the start of the raceway without load. Further, it can be taken from the drawing that the threaded spindle 17 driven by the electric motor 11 by way of the second reducing gear 3 has a three-part design and is comprised of a tubular first spindle member 20 which is in engagement with the threaded nut 16 or 28, an annular second spindle member 21, and a third spindle member 22 that interacts with the second reducing gear 3. The first spindle member 20 confines with the second part 28 of the threaded nut 16 helical screw thread undercuts 23 in which the balls 18 circulate.

The arrangement is preferably chosen in such a way that the rotor 10 of electric motor 11 will drive the threaded spindle 17 by the intermediary of the second reducing gear 3, while the first part 24 of the threaded nut 16 is supported on the first friction lining 4. Two radial bearings 8, 15 are used for the mounting support of the rotor 10, the said bearings being arranged in the motor casing 12 or in an end plate 35 which is axially supported on the motor casing 12.

In the embodiment of the present invention illustrated in the drawings, the necessary engine torque is reduced by an expedient integration of a planetary gear 30–34 forming the above-mentioned second reducing gear 3. The planetary gear, which is interposed between rotor 10 and threaded spindle 17 in terms of effect, is comprised of a sun wheel 30 which preferably includes an externally toothed area 26 on rotor 10, a plurality of stepped planet wheels, two of which are shown and have been assigned reference numerals 31 and 32, and a ring gear 33. The stepped planet wheels 31, 32 accommodated in a planet cage 34 have a first step interacting with the sun wheel 30 and a second step interacting with the ring gear 33, the first step being formed of toothed wheels 31a, 32a of large diameter and the second step being formed of toothed wheels 31b, 32b of small diameter. The ring gear 33 is formed of an internally toothed area of a cover 38 that forms the case of the planetary gear.

As can be taken from FIG. 1 in addition, the rotor 10 includes a radial collar 37 carrying components of a position detection system 36 (not shown) with the aid of which the current position of rotor 10 is determined. The information about the position is then determined by means of a Hall sensor or a magneto-resistive element.

The above-mentioned threaded nut 16 of the ball screw is preferably arranged with a radial play in a bowl-shaped guide member 29 having a defined elasticity so that it is guided by way of the threaded spindle 17 or 22. It is achieved thereby that an inclined position of the axis of the ball screw, which is caused by bending up of the brake caliper, is compensated by the elastic deformation of the guide member 29 and the threaded nut 16 which has a play and is not guided. The result is an even contact pressure of the linings 4, 5 and thus, a longer service life of the linings. It is especially favorable when the above-mentioned return area 25 of the balls 18 is additionally used as a rotation prevention mechanism of the threaded nut 16 in the guide member 29. The second annular spindle member or bead 21 is supported on an axial bearing 39 arranged within the guide member 29. The rigidity values of the bead 21 and an area of the guide member 29 axially opposed to the bead 21 are conformed to one another so that the mentioned parts will be subject to equal deformations during operation of the actuating unit of the present invention, with the result that the inclination of the two parts is equal (cf. FIG. 2 in particular). This provision achieves a uniform distribution of the load over the periphery of the guide member 29 onto the individual roll bodies 50 of the axial bearing 39, thereby allowing a maximum utilization of the load capacity of the ball screw with the best possible efficiency and an optimal packaging.

The third spindle member 22 is preferably connected to the planet cage 34 of the second reducing gear 3 by means of a coupling shaft 40. It is especially favorable when both ends of the coupling shaft 40 and the areas of the third spindle member 22 and the planet cage 34 in which the said ends are received are so configured that two universal joints 41, 42 are provided. The end of the coupling shaft 40 cooperating with the planet cage 34 is preferably received by means of an outside ring 49 of a radial bearing 48 provided in the cover 38. An elastic seal or sealing sleeve 27 compressed between the first part 24 of the threaded nut 16 and the guide member 29 prevents the ingress of contaminants into the interior of the ball screw.

Figure 2:
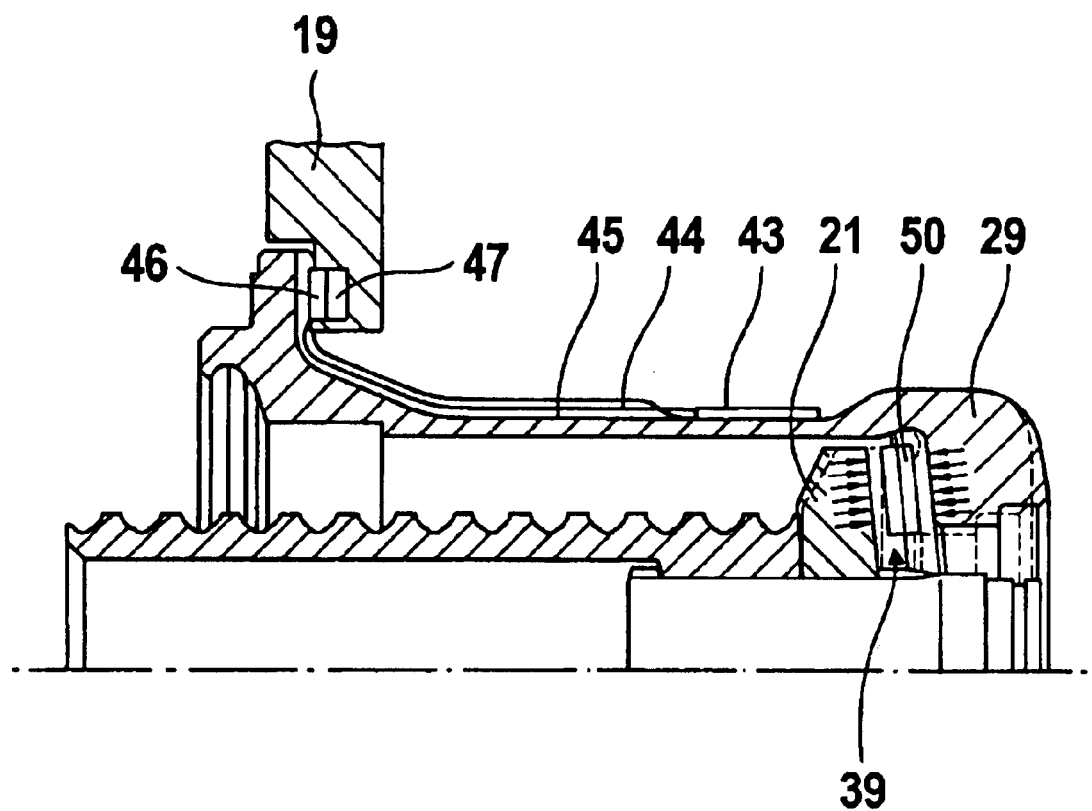
FIG. 2 is a simplified view of the first reducing gear used in the design of FIG. 1.

As can be seen in FIG. 2 in particular, measuring elements 43, e.g. wire strain gauges, are arranged on the surface of the guide member 29 and permit determining the actuating or clamping force that is indirectly measured as an axial deformation (expansion) of the guide member 29. Conduits 44 that are arranged in grooves 45 provided in the surface of guide member 29 and lead to an electric interface 46 are used for the electrical connection of the wire strain gauges 43. Interface 46 is preferably configured as a plug that is attached at the guide bowl 29. The electrical connection to an evaluating electronics (not shown) is established during the final assembly by means of a counter plug 47 integrated in the gearbox case 19.

Of course, various modifications are feasible in the spirit of the present invention. For example, the electric motor that is used as drive unit 1 may be designed as a switched reluctance motor (SR-motor). Other designs of the planetary gear are also possible, such as a two-stepped differential planetary gear or a gear whose planet wheels with their first step are in engagement with a sun wheel and with their second step, by the intermediary of each one spur wheel, are in engagement with a ring gear. Gear units which achieve high reduction ratios due to a deformable toothed ring and an eccentricity are of course also feasible.

List of Reference Numerals 1 drive unit
2 reducing gear
3 reducing gear
4 friction lining
5 friction lining
6 brake disc 7 actuating element
8 radial bearing
9 stator
10 rotor
11 electric motor
12 motor casing
13 carrier
14 permenent magnet segment
15 radial bearing
16 threaded nut
17 threaded spindle
18 ball
19 gearbox case
20 spindle member
21 spindle member
22 spindle member
23 screw thread undercut
24 threaded nut part
25 return area
26 area
27 seal
28 threaded nut part
29 guide member
30 sun wheel
31 planet wheel
31a planet wheel
31b planet wheel
32a planet wheel
32b planet wheel
33 ring gear
34 planet cage
35 end plate
36 position detection system
37 collar
38 cover
39 axial bearing
40 coupling shaft
41 universal joint
42 universal joint
43 measuring element, wire strain gauge
44 conduit
45 groove
46 interface, plug
47 counter plug
48 radial bearing
49 outside ring
50 roll body

What is claimed is:

1. Actuating unit, comprising:
   a first reducing gear in the form of a threaded pinion which includes balls as roll bodies, said balls residing in screw thread undercuts of a threaded spindle, and which also includes a return area for the balls, and
   a second reducing gear which is configured as a planetary gear having a planet cage that is in a rotary, force-transmitting connection with the threaded spindle,
   a coupling shaft rotatingly coupled between said planet cage and the threaded spindle, wherein the coupling shaft includes end portions which form universal joints with the planet cage and the threaded spindle and function to transmit a rotary torque between the planet cage and the threaded spindle.

2. Actuating unit as claimed in claim 1, wherein one end of the coupling shaft is accommodated in a hollow spindle member of the threaded spindle.

3. Actuating unit as claimed in claim 1, wherein one end of the coupling shaft is accommodated within the area of the planet cage in an outside ring of a radial bearing that is connected to the planet cage.

4. Actuating unit as claimed in claim 1, wherein the threaded pinion is coupled to two friction linings that cooperate with opposing lateral surface of a brake disc wherein said two friction linings are arranged so as to be displaceable within limits, wherein one of the two friction linings is adapted to be moved into engagement with the brake disc by way of a threaded nut attached to the threaded pinion and the other friction lining is adapted to be moved into engagement with the brake disc by the effect of a reaction force generated by the brake caliper, and wherein the actuating unit further includes an electric motor, wherein the first reducing gear is arranged between the electric motor and the actuating element, and wherein the second reducing gear is arranged between the electric motor and a part of the first reducing gear.

5. Actuating unit as claimed in claim 4, further including a guide member for embracing the threaded nut, wherein said guide member is supported on a gear housing that accommodates the ball screw and on which the threaded spindle is axially supported by means of a radial bead by the intermediary of an axial bearing, and wherein the rigidity of the radial bead and an opposite area of the guide member are chosen so that the contact surfaces of the axial bearing suffer from equal deformations during operation.

6. Actuating unit as claimed in claim 5, wherein the guide member has a defined elasticity, and wherein the threaded nut is arranged with play in the guide member.

7. Actuating unit as claimed in claim 4, wherein the threaded nut of the ball screw has a bipartite design, wherein a first part of the bipartite design cooperates with the first friction lining, and converts a rotational movement into translation of a second part of the bipartite design.

8. Actuating unit as claimed in claim 7, wherein the return area for the balls of the ball screw is designed in the second part.

9. Actuating unit as claimed in claim 8, wherein the balls are returned through a raceway, wherein the return area for the balls is configured as a rotation prevention mechanism of the threaded nut in the guide member.

10. Actuating unit as claimed in claim 4, wherein force measuring elements are provided at a guide member, and wherein the guide member includes an axial groove that receives conduits associated with the force measuring elements.

11. Actuating unit as claimed in claim 10, wherein an electric interface to which the force measuring elements are connected is arranged in the area of the guide member facing a friction lining.

* * * * *